(12) United States Patent
Erickson

(10) Patent No.: US 6,196,094 B1
(45) Date of Patent: Mar. 6, 2001

(54) TOOL UNIT CLAMPING APPARATUS HAVING A LOCKING MECHANISM WITH INCREASED GRIPPING FORCE

(75) Inventor: Robert A. Erickson, Raleigh, NC (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 08/406,088

(22) Filed: Mar. 17, 1995

(51) Int. Cl.[7] .................................................. B23B 29/00

(52) U.S. Cl. ............................ 82/158; 82/160; 409/232; 409/233

(58) Field of Search ..................... 82/158, 160; 409/232, 409/233, 234; 279/2.11, 2.23, 75; 408/240

(56) References Cited

U.S. PATENT DOCUMENTS

| | | |
|---|---|---|
| 2,926,020 | 2/1960 | Dayton et al. . |
| 4,209,182 | 6/1980 | Sheldon . |
| 4,406,195 * | 9/1983 | Kruger ................................... 82/160 |
| 4,708,040 | 11/1987 | Erickson . |
| 4,723,877 | 2/1988 | Erickson . |
| 4,726,268 | 2/1988 | Erickson . |
| 4,726,269 | 2/1988 | Erickson . |
| 4,736,659 | 4/1988 | Erickson . |
| 4,747,735 | 5/1988 | Erickson et al. . |
| 4,836,068 | 6/1989 | Erickson . |
| 4,897,014 * | 1/1990 | Tietze .................................. 279/2.23 |
| 4,932,295 | 6/1990 | Erickson . |
| 4,951,536 | 8/1990 | Robertson . |
| 5,011,346 * | 4/1991 | Pfalzgraf .............................. 409/234 |
| 5,173,017 | 12/1992 | Oshnock et al. . |
| 5,193,954 * | 3/1993 | Hunt ................................... 82/160 X |
| 5,245,896 | 9/1993 | Erickson et al. . |
| 5,261,302 | 11/1993 | Erickson et al. . |

FOREIGN PATENT DOCUMENTS

| | | |
|---|---|---|
| 36 06 331 A1 | 2/1986 | (DE) . |
| 0233321 * | 2/1986 | (DE) ..................................... 82/158 |
| 38 29 331 A1 | 8/1988 | (DE) . |
| 2070473 | 9/1981 | (GB) . |
| 8-243814 | 9/1996 | (JP) . |
| 1425968 * | 10/1990 | (SU) ................................... 279/2.23 |
| WO 9111281 | 8/1991 | (WO) . |

OTHER PUBLICATIONS

International Search Report mailed Jun. 27, 1996 for PCT/US96/01510, which is a foreign counterpart of the subject patent application.

* cited by examiner

Primary Examiner—Henry Tsai
(74) Attorney, Agent, or Firm—John J. Prizzi

(57) ABSTRACT

A clamping apparatus for detachably connecting a tool unit to a tool supporter with increased holding force is provided. The clamping apparatus includes a housing, a pair of opposing locking spheres within the housing, a cylindrical canister member mounted within the housing that is matable with an insert-supporting tool unit and which has a pair of opposing apertures in its sidewalls for conducting the locking spheres from a locking to an unlocking position, and a lock rod reciprocally movable within the interior of the canister member along an axis A and having opposing cam portions for radially moving the locking spheres through the canister apertures into wedging engagement with opposing angled walls of sphere receiving openings in the tool unit. To increase the mechanical advantage of the wedging action between the locking spheres and the angled walls of the tool unit, the aperture walls of the canister member are angled with respect to a line R extending radially from the lock rod axis A to reduce the angle between the aperture wall and the tool unit wall. Such angling increases the force of wedging and locking engagement between the locking spheres and the angled walls of the tool unit. In the preferred embodiment, the aperture walls are angled 15° with respect to the aforementioned radial line R, thereby increasing the holding force of the clamping mechanism by 30%.

3 Claims, 3 Drawing Sheets

TOOL UNIT CLAMPING APPARATUS HAVING A LOCKING MECHANISM WITH INCREASED GRIPPING FORCE

BACKGROUND OF THE INVENTION

This invention generally relates to an improved lock rod clamping apparatus for detachably connecting a tool unit to a tool supporter, and is particularly concerned with such an apparatus having an increased gripping force.

Clamping mechanisms for detachably connecting a tool unit to a tool supporter are well known in the art. One typical use of such mechanisms is in machining operations where the tool unit holds a cutting insert that is moved into and out of cutting engagement with a rotating metal workpiece. The clamping apparatus allows different tool units holding different cutting inserts to be quickly attached to and detached from the tool supporter which in turn is connected to a device that controls the movement of the tool units with respect to the workpiece.

One of the most commercially successful clamping mechanism includes a cylindrically-shaped canister member that is matable with the tubular end of a tool unit and which includes apertures for admitting locking elements into locking engagement with recesses present in the tool unit. The locking elements, which are typically spherical, are radially moved through the apertures in the canister member by means of cam surfaces present on a reciprocating lock rod. Examples of such a clamping mechanism are disclosed in Erickson U.S. Pat. Nos. 4,708,040; 4,747,735; 4,836,068, and 4,932,295, each of which is assigned to Kennametal Inc. located in Latrobe, Pa.

Such a prior art clamping mechanism is illustrated in FIG. 4. Here, a side, cross-sectional view of the distal end 62 of a canister member 39 is shown which includes an aperture 54a in the form of a cylindrical bore through the wall of the member 39. The inner diameter of the circular bore forming the aperture 54a closely approximates the outer diameter of the spherical locking element 57a. A reciprocating lock rod 60 includes a cam portion 64a having a spherical depression 66 which tapers off into a ramp 68. When the spherical locking element 57a is seated in the depression 66, and the lock rod 60 is moved against the bias of the springs 74 (shown in FIG. 3) toward the distal end of the canister member 39 so that its stop flange 70 is in the position illustrated in FIG. 3, the spherical element 57a is in a non-locking position. This unlocking position allows the tubular shank 16 of a tool unit 10 to be inserted into the annular recess 59. However, when the springs 74 are released to pull the lock rod 60 away from this position toward the position illustrated in FIG. 4, the ramp of the cam portion 64a wedgingly engages and radially raises the spherical locking element 57a into the locking position shown. In such a position, the spherical locking element will wedgingly and lockingly bear against the angled wall 30 of the tool unit 10.

While such a prior art locking mechanism has proven its capability of quickly, conveniently, and rigidly attaching a tool unit to a tool supporter, the applicant has observed an area where the performance of such a mechanism could be substantially improved. Specifically, the applicant has observed that if the clamping mechanism could be modified to increase the clamping force applied to the tool unit without increasing the pull-back force that the spring package applies to the lock rod, then a smaller and shorter spring package could be used to achieve the same holding force. Such a smaller spring package would advantageously shorten the envelope of the tool, which in turn would render the tooling system incorporating the clamping mechanism easier and more convenient to use in a working environment. Additionally, the life span of the springs used in the package (which are typically Bellville washers) would be lengthened. Alternatively, if a spring package of conventional size were used, the holding force between the clamping mechanism and the tool unit would be increased, which in turn would increase tool rigidity and enhance the accuracy of the cutting operation.

Clearly, it would be highly advantageous if a way could be found to increase the holding force that such a clamping mechanism generates with respect to a tool unit for a given pull-back force on the lock rod to make possible either the use of a small spring package, with a consequent reduction in the overall size of the tool envelope or an increase in tool rigidity and cutting accuracy with the use of a spring package of conventional size. Ideally, such a holding force-increasing solution should require only a minimal amount of modification to the shapes of existing parts so that a conventional clamping mechanism of the type previously described could easily be converted into an improved clamping mechanism with a minimum amount of disassembly and machining.

SUMMARY OF THE INVENTION

Generally speaking, the invention is a clamping mechanism for detachably connecting a tool unit to a tool supporter with an improved holding force that fulfills all the aforementioned criteria.

The inventive clamping mechanism comprises at least one locking element, which may be in the form of a sphere; a canister matable with a tool unit and having an aperture for admitting a locking sphere through a wall thereof; a lock rod reciprocally movable within the canister member along a longitudinal axis and having a cam portion for moving the locking sphere through the canister aperture into wedging and locking engagement with a wall of the tool unit, wherein the canister aperture walls are not cylindrical, i.e., are not orthogonal to the longitudinal axis of the lock rod, but instead are angled with respect to a line extending radially from this axis for increasing the force of locking and wedging engagement between the locking element and the tool unit.

Such an angling of the aperture walls increases the force of wedging engagement by increasing the mechanical advantage between the locking sphere and the wall of the tool unit that is engaged by this sphere when it is forced radially outwardly by the cam portion of the lock rod. In the preferred embodiment, the aperture walls are angled between about 50 and 20° with respect to a line extending radially from the lock rod axis, and more preferably between 7° and 15° with respect to this radial line. As the wall of the tool unit that engages the locking sphere is engaged between about 50° and 60° with respect to this radial line, the locking sphere wedgingly engages the wall of the tool unit at a shallower angle, thereby increasing the mechanical advantage associated with its engagement against the tool unit.

As the invention may be incorporated into a prior art clamping mechanism by merely boring the canister member apertures obliquely with respect to the axis of rotation of the canister member as opposed to orthogonally, the invention may be easily incorporated into existing clamping mechanisms with a minimum amount of machining operations. Moreover, as the incorporation of the invention into a clamping mechanism increases the holding force by 30%, the invention allows smaller spring packages to be used with all their envelope-reducing and longevity-increasing advantages.

BRIEF DESCRIPTION OF THE SEVERAL FIGURES

Figure 5:
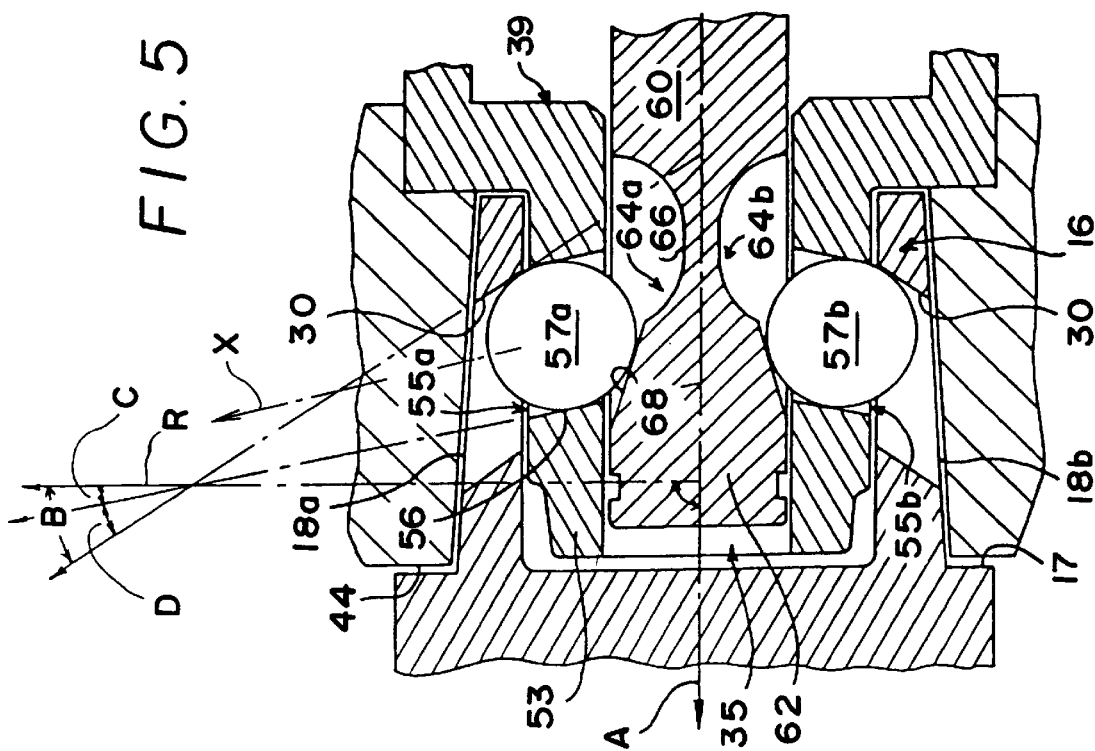
Figure 4:
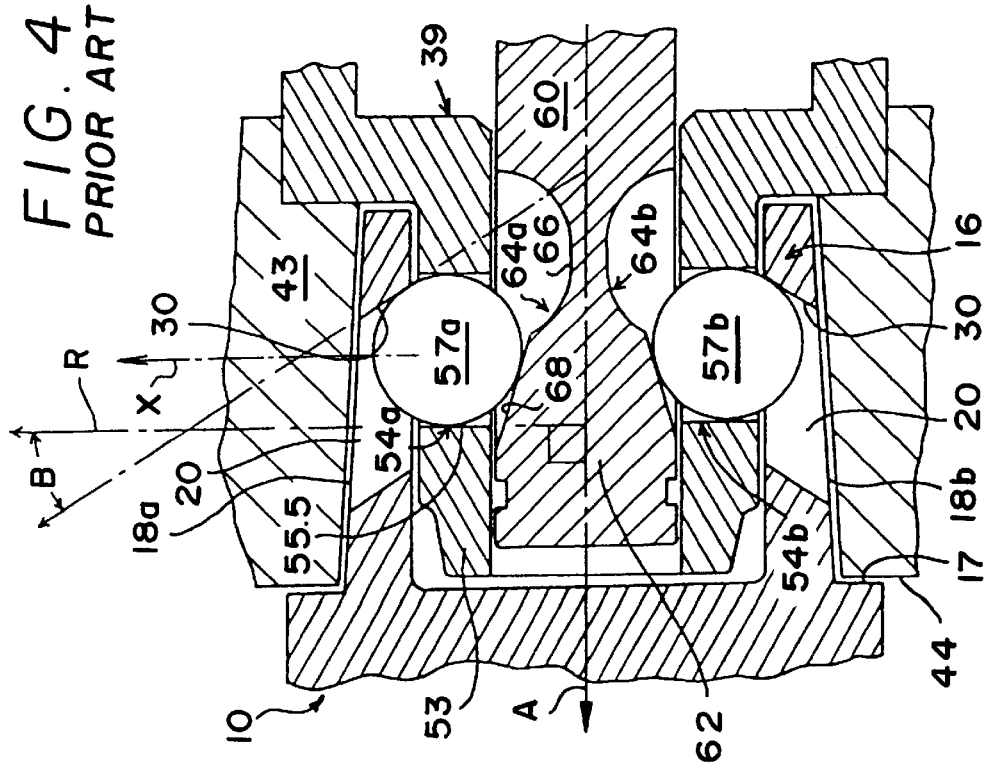

FIG. 4 is an enlarged, cross-sectional side view of a prior art clamping mechanism connecting a tool unit to a tool supporter, and FIG. 5 is an enlarged, cross-sectional side view of the clamping mechanism of the invention connecting a tool unit to a tool supporter, illustrating in particular how the angling of the canister member apertures increases the wedging and clamping forces between the locking spheres and the angled walls of the tool unit.

DETAILED DESCRIPTION OF THE PREFERRED EMBODIMENT

Figure 1:
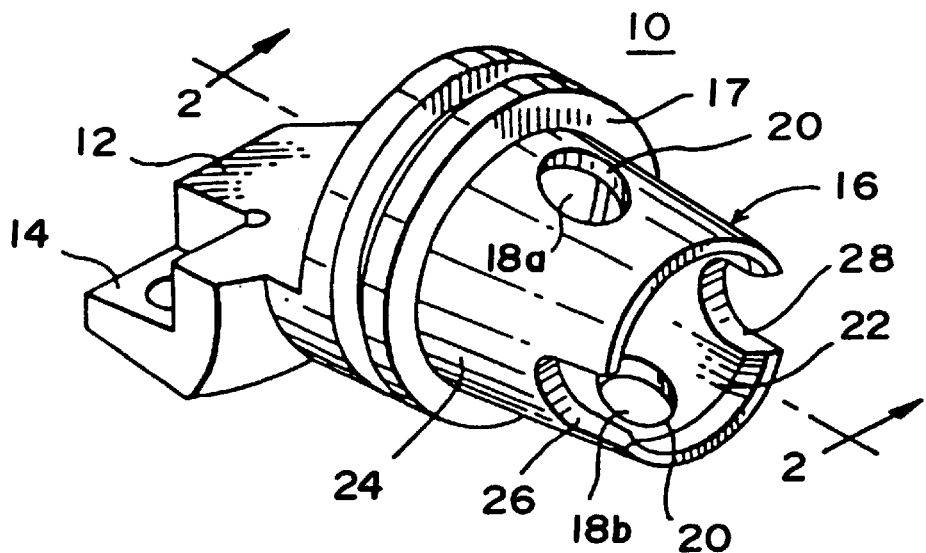
FIG. 1 is a perspective view of a tool unit of the type secured by the clamping mechanism of the invention.
Figure 2:
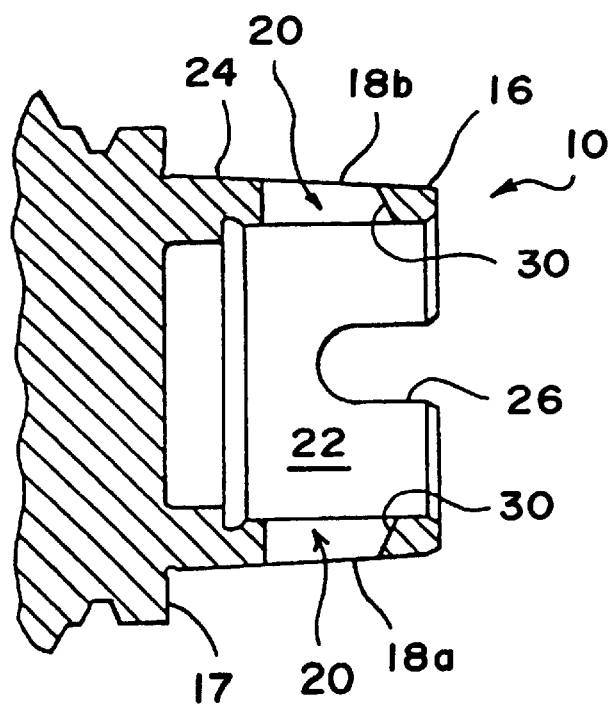
FIG. 2 is a cross-sectional side view of the tool unit illustrated in FIG. 1 along the line 2—2.

With reference now to FIGS. 1 and 2, the tool unit 10 used in conjunction with the clamping mechanism of the invention has a forward end 12 for holding a cutting tool, and a rearward tubular shank 16 for connection to a tool supporter. The forward end 12 includes a recess or pocket 14 which is conventional in design for receiving an indexable cutting insert, locking bracket, and shim (not shown). At the junction between the forward end 12 and the tubular shank 16 is an annular abutment face 17 for engagement with the annular face of a tool supporter when the tool unit is connected to such a supporter by way of a clamping mechanism. The abutment face 17 is planar and is orthogonally oriented with respect to the axis of rotation of the tubular shank 16.

As is indicated in FIG. 2, the tubular shank 16 is preferably integrally formed with the forward end 12 of the tool unit 10 from a single piece of steel, and has a frustro-conical shape. The shank 16 includes a pair of opposing openings 18a,b for receiving the spherical locking elements of the clamping mechanism which are described hereinafter. The walls 20 of the openings 18a,b are not cylindrical completely around their circumference, but instead include angled wall portions 30 (as shown in FIG. 2) for facilitating the locking engagement between the shank 16 and the spherical locking elements of the clamping mechanism. The inner surface 22 of the tubular shank 16 is substantially cylindrical in shape so as to closely mate with the outer surface of the canister member of the locking mechanism which will be described shortly. The shank outer surface 24 is frustro-conical for the purposes of both centering and rigidifying the coupling between the tool unit 10 and a tool supporter. Disposed orthogonally with respect to the opposing openings 18a,b are alignment slots 26 and 28. These slots 26,28 fit into protruding keys (not shown) present in the canister member 39 of the clamping mechanism to insure alignment between the openings 18a,b with the spherical locking elements of the clamping mechanism.

Figure 3:
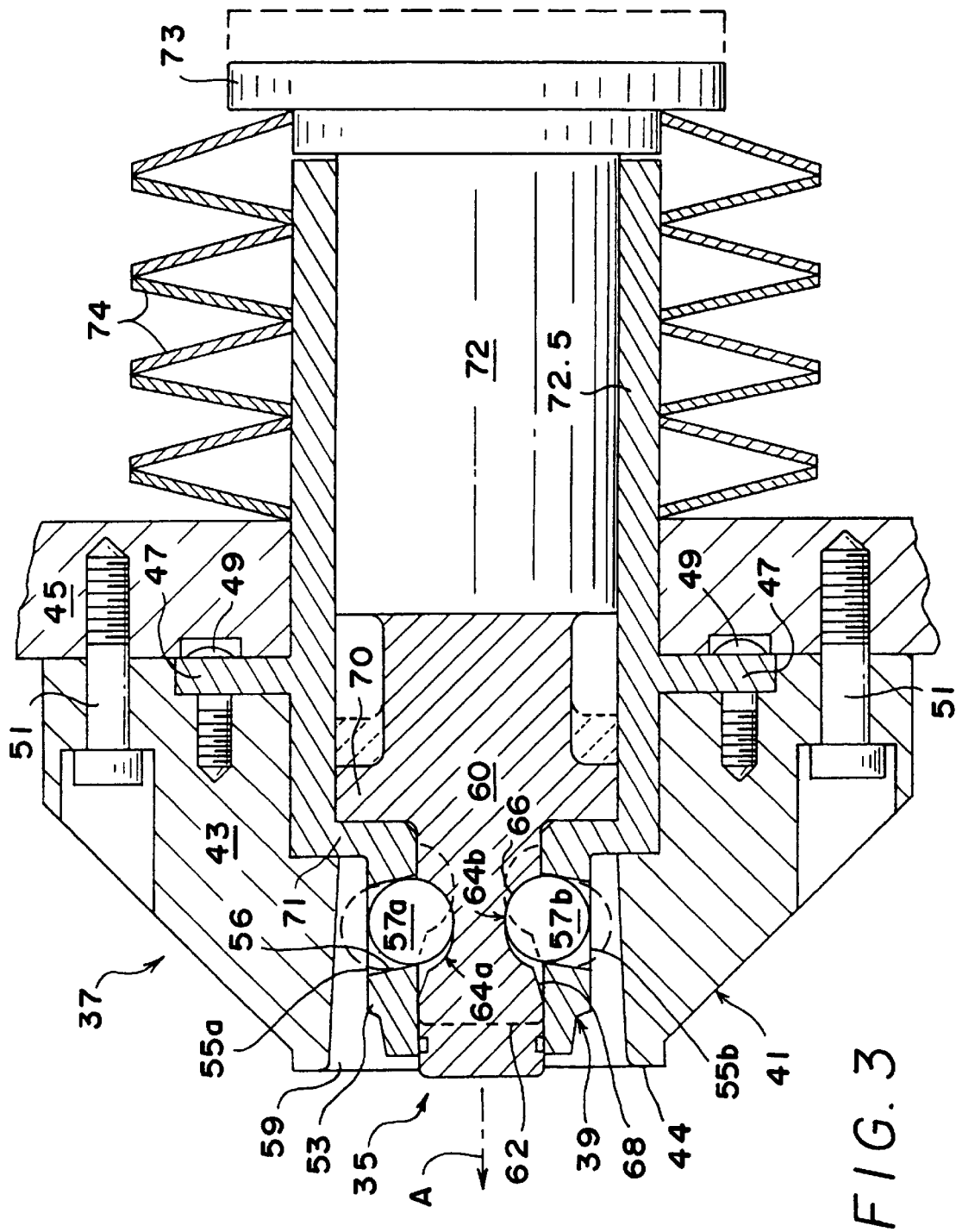
FIG. 3 is a cross-sectional side view of the clamping mechanism of the invention that detachably connects the tool unit of FIGS. 1 and 2 to a tool supporter.

With reference now to FIG. 3, the clamping mechanism 35 of the invention is disposed within a tool supporter housing 37 as shown. The clamping mechanism includes a cylindrically shaped canister member 39 mounted within a housing 41 formed from a coupling member 43. The coupling member 43 terminates, at its distal end, in an annular abutment face 44 that confronts the previously discussed abutment face 17 of the tool unit 10 when the two are connected. The tool supporter housing 37 further has a support plate 45 disposed behind the coupling member 43. The canister member 39 is affixed to the housing 41 by way of an annular flange 47 secured to the coupling member 43 by bolts 49. Coupling member 43 is in turn secured to the support plate 45 by means of bolts 51. Thus the canister member 39 remains stationary relative to the lock rod 60 during the operation of the clamping mechanism 35, which will be described shortly.

The distal end 53 of the canister member 39 includes a pair of opposing apertures 55a,b for admitting locking elements in the form of spheres 57a,b to the position shown in phantom. It is important to note that the walls of the apertures 55a,b are not cylindrical bores whose walls are at right angles to the axis A. Rather, they are bores whose walls 56 are angled with respect to a line extending radially from the axis A (which is both the axis of movement of the lock rod 60). As will be described in more detail later, such an angling of the aperture walls increases the locking and wedging forces that the locking spheres 57a,b apply against the angled walls 30 of the tool unit 10. As is indicated by the phantom representations of the locking spheres 57a,b, the angling of these walls 56 causes the spheres to move a slightly axial as well as radial direction during a locking operation.

In addition to the canister member 39 and locking spheres 57a,b, the clamping mechanism 35 of the invention further includes lock rod 60 which is reciprocally movable along the axis A from the unlocking position illustrated in FIG. 3 to the phantom position illustrated in the same Figure. The lock rod 60 has a distal end 62 concentrically disposed within and slidably movable with respect to the distal end 53 of the canister member 39. The distal end 62 includes opposing cam portions 64 for moving the locking spheres 57 in a generally radial direction and into locking engagement with the tool unit 10. To this end, each of the cam portions 64 includes a depression 66 which is partly complementary in shape to the locking spheres 57, and a ramp 68 extending from one side of the depression 66 toward the distal end 62 of the rod 60. The proximal end of the lock rod 60 includes a cylindrical shaft 72 which is reciprocally slidable in a proximal end 72.5 of the canister member 39. The shaft 72 of the lock rod 60 terminates in a spring retainer 73 which may take the form of an annular flange as shown. Springs which may be in the form of Bellville washers 74 are slidably and concentrically disposed around the outer surface of the proximal end 72.5 of the canister member between the plate 45 and retainer 73. These washers 74 are normally compressed to apply a longitudinally-oriented tensile force on the lock rod 60 such that the lock rod is biased in a withdrawn position (indicated in phantom) that acts to extend the locking spheres 57a,b into the locking position illustrated in phantom.

The operation of the invention will now be described with respect to FIGS. 4 and 5. As has been previously indicated, FIG. 4 illustrates a prior art clamping mechanism wherein the walls 55.5 of the apertures 55a,b in the canister member 39 are cylindrical relative to an axis of rotation X, the axis X and walls 55.5 being parallel to a line R extending radially from the axis A. In such a clamping mechanism, when the lock rod 60 is withdrawn by the compressed Bellville washers 74, the locking spheres 57a,b are radially extended by the ramp section 68 of the cam portions 64*a,b*. When extended, the locking spheres 57*a,b* come into locking engagement with the angled walls 30 that form part of the apertures 18*a,b* of the tool unit 10. In such a locking mechanism, the wall 30 of the tool unit 10 is canted an angle B with respect to the radial line R of between about 30° and 40°, and most preferably 35°. Because the walls 55.5 of the apertures 55*a,b* are parallel to the radial line R proximal portions of the locking spheres 57*a,b* wedgingly and lockingly engage the angled walls 30 at angle B, shown as a 35° angle.

By contrast, in the clamping mechanism of the invention shown in FIG. 5, the axis X and the walls 56 of the apertures 55*a,b* of the canister member 39 are inclined at an angle C with respect to a line R radially extending from the axis A. In the preferred embodiment, the angle C is between 5° and 20°, and is more preferably between 10° and 15°. Consequently, when the ramp 68 of each of the cam portions 64*a,b* of lock rod 60 radially pushes the locking spheres 57*a,b* outward toward the tool unit 10, the angled walls 56 of the apertures 55*a,b* guide the spheres into the angled walls 30 of the tool unit 10 not at an angle B of approximately 35°, but rather at a smaller angle D which is between about 15° and 25°, and most preferably 20°. The smaller engagement angle (i.e., 20° versus 35°) between the proximal end of the locking spheres 57*a,b* and the angled wall 30 of the tool unit 10 creates a greater mechanical advantage in the wedging action between the rounded surface of the spheres 57*a,b* and the angled walls 30 of the tool unit 10. This greater mechanical advantage results in a clamping force that is on the order of 30% higher than the clamping force generated by the prior art clamping mechanism illustrated in FIG. 4 when the same number and type of Bellville washers 74 are used. Alternatively, the clamping mechanism 35 illustrated in FIG. 5 would be capable of generating the same amount of clamping force as the FIG. 4 clamping mechanism with a spring package comprising either a fewer number of Bellville washers 74, or washers 74 that were smaller, thereby shortening the envelope of the mechanism 35. The clamping mechanism 35 of FIG. 5 can also increase the longevity of the Bellville washers 74 used in the spring packet by reducing the amount of stress and fatigue that the washers 74 must apply to the lock rod 60 to generate acceptable clamping forces.

While this invention has been described with respect to a specific embodiment, various revisions, modification, and variations of the invention will become evident to persons skilled in the art. All such variations, additions, and modifications are intended to be encompassed within the scope of the invention, which is limited only by the claims appended hereto.

What is claimed is:

1. An improved clamping apparatus for detachably connecting a tool unit to a tool supporter, wherein said apparatus is of the type having a housing with a tool unit receiving area therein, a canister member having a distal end outwardly facing the received tool unit, said cannister member being mounted within said housing and being matable with the tool unit and including a canister wall having an exterior and an interior and at least one aperture extending therethrough and having walls for admitting and guiding a locking element, and a lock rod that is reciprocally movable along an axis (A) and that has a cam portion for moving the locking element radially through said canister aperture into a mechanically advantageous wedging and locking engagement with a wall of said tool unit when said lock rod is axially moved in a direction away from said tool unit, said wall of said tool unit being angled with respect to a line (R) extending radially from said axis (A), and canted toward said distal end of said canister member wherein the improvement comprises:

cylindrically shaped aperture walls having an axis operation (X) canted toward said distal end of said canister in said canister member that is angled greater than 5° but less than 20° with respect to said radial line (R) when viewed in a plane formed by said axis (A) and said axis of rotation, such that said aperture walls guide said locking element into said tool unit wall at an angle that reduces the amount of radial movement that said locking element moves per an amount of linear movement of said lock rod along axis (A) such that a force of locking and wedging engagement between said locking element and said tool unit wall is increased per unit of axial force applied to said lock rod.

2. The clamping apparatus of claim 1, wherein said locking element is a locking sphere, and said aperture walls are angled between about 7° and 15° with respect to said line (R) extending radially from said axis (A).

3. The clamping apparatus of claim 1, wherein said tool unit wall is angled between about 50° and 60° with respect to said line (R) extending radially from said axis (A).

* * * * *